(12) United States Patent
Diachina et al.

(10) Patent No.: US 9,137,709 B2
(45) Date of Patent: Sep. 15, 2015

(54) SYSTEM AND METHOD FOR PROVIDING VOICE SERVICE IN A MULTIMEDIA MOBILE NETWORK

(75) Inventors: John Diachina, Garner, NC (US); Hans Krister Mikael Sällberg, Lund (SE); Lars Håkan Palm, Växjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 835 days.

(21) Appl. No.: 13/287,506

(22) Filed: Nov. 2, 2011

(65) Prior Publication Data

US 2012/0046037 A1 Feb. 23, 2012

Related U.S. Application Data

(62) Division of application No. 12/137,410, filed on Jun. 11, 2008, now Pat. No. 8,094,620.

(60) Provisional application No. 60/946,189, filed on Jun. 26, 2007.

(51) Int. Cl.
*H04W 4/00* (2009.01)
*H04W 36/00* (2009.01)

(52) U.S. Cl.
CPC ................................ *H04W 36/0022* (2013.01)

(58) Field of Classification Search
CPC . H04W 80/04; H04W 36/18; H04W 36/0011; H04W 36/14; H04W 36/08; H04L 12/6418; H04L 65/102; H04L 29/06176

USPC .................. 370/352, 349, 389, 353–357, 331
See application file for complete search history.

(56) References Cited

U.S. PATENT DOCUMENTS

| | | |
|---|---|---|
| 6,477,382 B1 | 11/2002 | Mansfield et al. |
| 6,845,238 B1 | 1/2005 | Muller |
| 8,094,620 B2 | 1/2012 | Diachina et al. |
| 2002/0090975 A1 | 7/2002 | Laiho et al. |
| 2004/0180660 A1 | 9/2004 | Choi et al. |
| 2005/0245263 A1 | 11/2005 | Ejzak |

(Continued)

FOREIGN PATENT DOCUMENTS

| | | |
|---|---|---|
| EP | 1 753 260 A1 | 2/2007 |
| WO | WO 2006/040673 A2 | 4/2006 |

(Continued)

*Primary Examiner* — Brenda H Pham

(57) ABSTRACT

User Equipment (UE) receiving non-voice packet switched services in an Evolved Universal Mobile Telecommunications System Terrestial Radio Access Network (eUTRAN) cell undergoes handover to a circuit switched GSM/Edge Radio Access Network (GERAN)/UTRAN cell in response to a voice service page. An eNodeB of the active eUTRAN cell uses a measurement report history for the UE to select an available circuit switched cell for handover. The voice service is established in the circuit switched domain of a GERAN/UTRAN cell to ensure service continuity regardless of UE mobility that would otherwise not be possible if the voice service was established in the eUTRAN cell. A Gs-like interface between a Mobile Switching Center (MSC) of the CS Core Network and the Mobility Management Entity (MME) of the Evolved Packet Core provides an interface for page requests and location update procedures to be performed.

34 Claims, 3 Drawing Sheets

(56) References Cited

U.S. PATENT DOCUMENTS

| | | |
|---|---|---|
| 2006/0276190 A1 | 12/2006 | Shaheen |
| 2009/0036131 A1 | 2/2009 | Diachina et al. |
| 2010/0202243 A1 | 8/2010 | Stirner |
| 2010/0202413 A1 * | 8/2010 | Vikberg et al. ............... 370/332 |
| 2010/0208624 A1 | 8/2010 | Vikberg et al. |

FOREIGN PATENT DOCUMENTS

| | | |
|---|---|---|
| WO | WO 2007/007990 A1 | 1/2007 |
| WO | WO 2007/039757 A2 | 4/2007 |

* cited by examiner

SYSTEM AND METHOD FOR PROVIDING VOICE SERVICE IN A MULTIMEDIA MOBILE NETWORK

CROSS-REFERENCE TO RELATED APPLICATIONS

This application is a divisional of U.S. patent application Ser. No. 12/137,410 now U.S. Pat. No. 8,904,620 B2 filed Jun. 11, 2008, which claims the benefit of U.S. Provisional Application No. 60/946,189 filed Jun. 26, 2007, the disclosures of which are incorporated herein by reference. This application is also related to U.S. patent application Ser. No. 12/137,393, filed on Jun. 11, 2008.

FIELD OF THE INVENTION

The present invention relates to multimedia networks. More particularly, and not by way of limitation, the present invention is directed to a system and method for providing voice service in a multimedia mobile network.

BACKGROUND OF THE INVENTION

UMTS (Universal Mobile Telecommunications System) Terrestial Radio Access Network (UTRAN) is a 3G technology for wireless provision of multimedia services. The deployment of Evolved UTRAN (eUTRAN), also known a Long Term Evolution (LTE) and Evolved Packet Core (EPC), requires telephony services to be migrated from a traditional circuit switched (CS) system to a packet switched (PS) system, e.g. provided by Multimedia Telephony Service for IMS (MTSI). This requires the Internet Protocol (IP) Multimedia Subsystem (IMS) to be widely deployed earlier than eUTRAN and EPC.

It would be advantageous to provide an architecture which allows the reuse of deployed CS core network infrastructure for supporting voice service when introducing eUTRAN and EPC.

BRIEF SUMMARY OF THE INVENTION

In one aspect, the present invention is directed to an Evolved Packet Core network comprising a mobility management entity configured to identify a voice service requirement for a User Equipment, recognize support for a Gs-like interface, and handover the User Equipment to a circuit switched cell in response to the voice service requirement and in response to the recognition of support for a Gs-like interface.

In another aspect, the present invention is directed to a mobile telecommunications device configured to receive a handover from a packet switched cell to a circuit switched cell and perform circuit switched call establishment procedures with the circuit switched cell at the completion of a handover procedure.

In yet another aspect, the present invention is directed to an eNodeB configured to accept a handover command in respect of a user equipment, obtain a measurement report for the user equipment and handover the user equipment to a circuit switched cell indicated in the measurement report, wherein the handover command is accepted in response to a request for voice service with the user equipment.

In yet another aspect, the present invention is directed to a method for user equipment to establish a voice service. The method comprises receiving a handover command for handover from a packet switched cell to a circuit switched cell and performing circuit switched call establishment procedures with the circuit switched cell at the completion of a handover procedure.

In yet another aspect, the present invention is directed to a method for providing voice service to User Equipment (UE) operating in a packet switched domain of an Evolved Universal Mobile Telecommunications System Terrestrial Radio Access Network (eUTRAN) cell. The method comprises generating a voice service requirement, determining a circuit switched cell, and establishing voice service between said UE and said circuit switched cell in a circuit switched domain based on the generating and the determining.

In yet another aspect, the present invention is directed to a network comprising a plurality of circuit switched cells and an Evolved Packet System (EPS). The EPS comprises a plurality of Evolved UTRAN cells (eUTRAN) and at least one Evolved Packet Core (EPC). The EPC is configured to handover a User Equipment (UE) operating in at least one of the eUTRAN cells to at least one of the circuit switched cells in response to a voice service requirement.

In yet another aspect, the present invention is directed to a method for an Evolved Packet Core to establish a voice service comprising identifying a voice service requirement and performing a handover from a packet switched cell to a circuit switched cell.

BRIEF DESCRIPTION OF THE SEVERAL VIEWS OF THE DRAWING

In the following section, the invention will be described with reference to exemplary embodiments illustrated in the figures, in which.

DETAILED DESCRIPTION OF THE INVENTION

Figure 1:
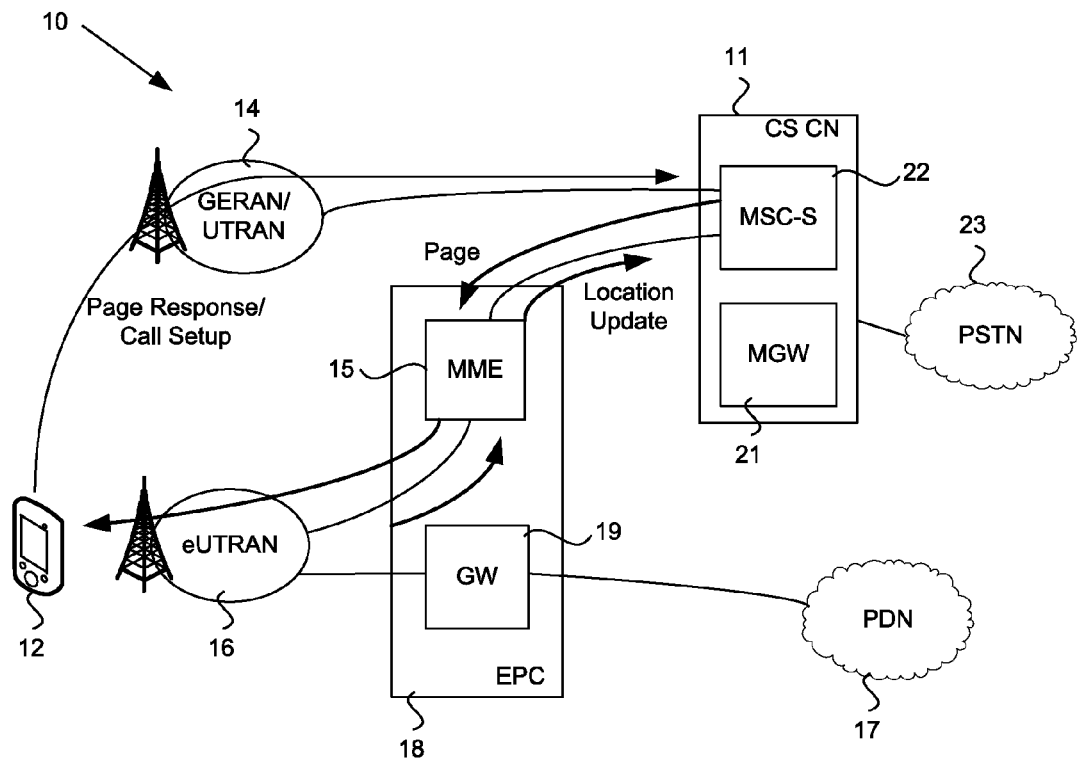
FIG. 1 is a schematic representation of a network utilized in an embodiment of the present invention.

A network 10 is shown generally in FIG. 1. A CS Core Network (CN) 11 includes a Media Gateway (MGW) 21 and a Mobile Switching Center (MSC) 22. Other aspects of the CS domain are also assumed to be present, such as the Home Location Register (HLR), etc. but are omitted for clarity. The CS Core Network 11 provides voice service from a Public Switched Telephone Network (PSTN) 23 to user equipment (UE) 12 through 2G/3G Radio Access Network (RAN) cells, e.g. GERAN (GSM/Edge Radio Access Network) or UTRAN 14. The network 10 also includes an Evolved Packet System (EPS) comprising an eUTRAN 16 providing PS services, including voice, via one or more eUTRAN cells. PS services are provided from a Packet Data Network 17 via an Evolved Packet Core (EPC) network 18 including a serving gateway 19 and a Mobility Management Entity (MME) 15. The MME 15 provides control aspects including idle mode UE location tracking as well as paging procedures in accordance with eUTRAN standards.

In the network 10 of FIG. 1, voice service may be provided to the UE 12 in the PS domain via the eUTRAN cells or in the CS domain via the GERAN/UTRAN cells since the coverage areas provided by these cells is expected to involve a very significant degree of overlap. In the present example, it is considered that the UE 12, also referred to as a mobile station (MS) is operating in an eUTRAN cell controlled by eUTRAN 16 (also known as an LTE cell) with one or more active packet services that do not include a voice component, i.e. there is no ongoing voice service in the eUTRAN cell. When a voice service is needed it could be established in the PS domain as a VoIP service within the current eUTRAN cell. However, if the roll out of eUTRAN service is phased in that IMS service is not present at initial LTE deployment, there may be eUTRAN coverage areas that are overlapped by GERAN/UTRAN coverage areas. In these overlapped areas, continuity of voice service initiated within eUTRAN cells may not be possible when the UE 12 approaches the edge of eUTRAN coverage due to the lack of the domain transfer function (DTF) associated with IMS service deployment. As such, to allow voice calls to be established in an eUTRAN cell when IMS is not supported would result in those calls being dropped if the UE were to leave the LTE coverage area. If instead, at the point when voice service is desired the UE 12 is made to leave the eUTRAN cell even though eUTRAN coverage is still available and take advantage of the overlaid coverage area of a 2G (GERAN) or 3G (UTRAN) cell, then the voice service can be established in the CS domain using a 2G/3G cell without concern for it being prematurely dropped as could happen if it was established in the eUTRAN cell, since 2G/3G cell coverage is considered to be ubiquitous. Thus, in one embodiment, the requirement to establish a voice service while the UE 12 is within LTE coverage triggers a handover of the UE 12 from the eUTRAN cell to a GERAN/UTRAN cell where the desired voice service is established in the CS domain.

Figure 2:
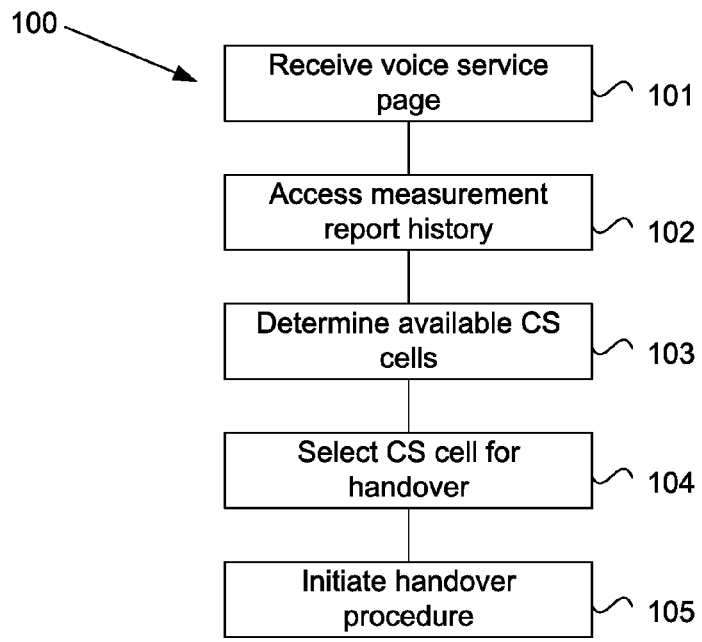
FIG. 2 is a flowchart of a method for providing packet switched handover from an eUTRAN cell.

A method for providing voice service to a UE operating in a packet switched domain of an eUTRAN cell will now be described with reference to FIG. 1 and to the flowchart 100 of FIG. 2. At step 101, a voice call page is received by the MME 15 of the EPC 18 from an MSC 22 of the CS Core network 11. The MME 15 forwards the page to the eNodeB 33 (shown in FIG. 3) of the eUTRAN cell. The page the MME sends to the eNodeB indicates voice call establishment in the CS domain is required. The eNodeB 33 is aware of one or more active PS services for the UE 12 and is thus able to access a measurement report history for the UE 12 in the eUTRAN 16 (step 102). The eNodeB 33 uses the existing measurement report history to determine the neighbour GERAN/UTRAN cells that can be selected as PS Handover candidates (step 103) (i.e. the eNodeB 33 does not need to acquire additional channel measurement history from the UE before selecting a candidate GERAN/UTRAN cell). The eNodeB sends a page to the UE and upon receiving the page response it selects one of these neighbour cells (step 104) and triggers the PS handover procedure (step 105). For the indirect MT voice service request case the MME triggers paging of the UE using generic paging procedures where the page it sends to the eNodeB does not indicate that an Inter-RAT PS handover to a GERAN/UTRAN cell should be performed. Upon receiving a service request from the UE (via the eNodeB) in response to the paging attempt, the MME will realize that an Inter-RAT PS handover to GERAN/UTRAN is necessary and can therefore respond to the service request by ordering the eNodeB to perform an Inter-RAT PS HO to a GERAN/UTRAN cell for that UE (i.e. instead of performing call establishment procedures in the packet switched domain). The eNodeB 33 then uses the existing measurement report history to determine the neighbour GERAN/UTRAN cells that can be selected as PS Handover candidates, selects one of these neighbour cells and then triggers the PS handover procedure, as per steps 103-105 discussed above. In the handover procedure, the UE 12 is sent a PS Handover command directing the UE to the selected GERAN/UTRAN cell. The PS Handover command includes a "cause code" indicating that an MT CS domain voice call needs to be established. The UE 12 thus arrives in the GERAN/UTRAN cell 14 and, after completion of the PS Handover procedure, (i.e. the non-voice services ongoing in the LTE cell are assigned radio resources to use in the GERAN/UTRAN cell selected for handover), the UE immediately proceeds as if paged for a voice call in the CS domain. That is, the UE 12 sends a page response to the MSC 22. CS domain voice service is then established between the UE 12 and the GERAN/UTRAN 14 and the CS CN 11 as per legacy procedures for MT/MO call setup.

If the UE 12 and the GERAN/UTRAN 14 do not both support dual transfer mode, then once the voice service is established in the CS domain the PS resources are dropped. If the UE and the GERAN/UTRAN 14 both support dual transfer mode, then the PS resources are maintained in parallel with the resources required for the CS domain speech service. The case of PS handover to a UTRAN cell can be considered as the logical equivalent of PS handover to a GERAN cell where dual transfer mode is supported since UTRAN inherently allows for PS domain and CS domain services to operate in parallel.

In either case (dual transfer mode supported or not) there is no need for a subsequent intra-cell handover to be performed (i.e. to assign the CS domain resources required for the voice service) following the PS handover from the eUTRAN cell because the CS domain resources are assigned in the target GERAN/UTRAN cell as part of the legacy MT and MO voice service establishment procedures. If dual transfer mode is not supported then the PS resources assigned by the target GERAN cell as part of the eUTRAN to GERAN handover procedure are only kept until the CS service is established and then explicitly or implicitly released.

If the UE 12 and the GERAN/UTRAN 14 do not both support dual transfer mode or the set of active PS services in the eUTRAN cell are not delay sensitive to the point of strictly needing a PS handover for cell change, then the UE 12 or the eUTRAN 16 could still trigger a PS handover to a GERAN/UTRAN cell in order to minimize the delay in establishing the desired voice service in the CS domain.

Figure 3:
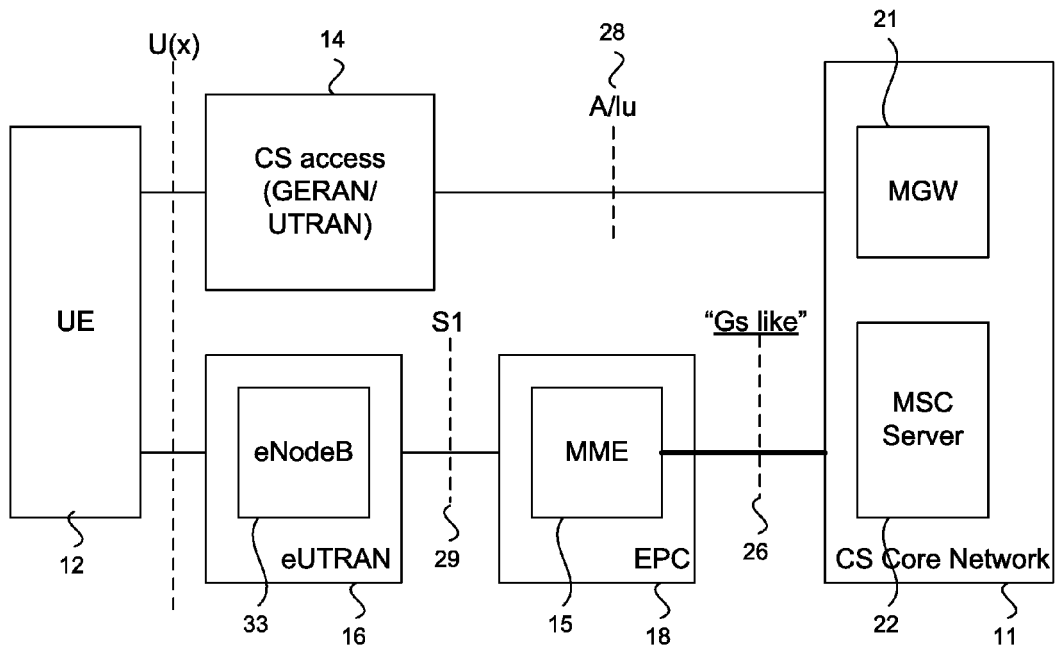
FIG. 3 shows the interfaces of the network of FIG. 1.

A block diagram showing the network interfaces is shown in FIG. 3. The user equipment 12 has circuit switched access through a GERAN/UTRAN 14 which communicates with the CS core network 11 through an A/Iu interface 28. The UE 12 also communicates with an eNodeB 33 of the eUTRAN 16. The eUTRAN 16 interfaces with the Evolved Packet Core (EPC) 18 through an S1 interface 29, as is known for 3GPP.

In a typical circuit switched Generic Packet Radio Services (GPRS) network, PS domain mobility management is performed by a Serving GPRS Support Node (SGSN) where a Gs interface is provided between the SGSN and the MSC to provide CS domain location update information to the MSC. In an EPS network, mobility management is performed by a mobility management entity (MME) 15 of the Evolved Packet Core (EPC) 18. Thus in order to maintain CS domain mobility management functions in the MSC server 22, a "Gs like" interface 26 is provided between the MME 15 of the EPC 18 and the MSC server 22 of the CS Core Network 11. The Gs-like interface 26 can be used for the CS domain Location Update procedure (normally triggered in a GERAN cell during the PS handover procedure) so that CS Paging messages can be sent from the MSC server 22 to the MME 15.

The presence of the Gs-like interface can be used as a trigger for the MME to determine when to perform the PS Handover to the CS core network. For the direct MT voice service request case, the MME can send the eNodeB a page indicating that an Inter-RAT PS handover to a GERAN/UT- RAN cell should be performed (i.e. instead of performing call establishment procedures in the packet switched domain) in which case the eNodeB sends a signaling message to the UE that serves as a page. Upon receiving a response to this page the eNodeB using existing measurement history to command the UE to perform an Inter-RAT PS handover to a GERAN/UTRAN cell. For the indirect MT voice service request case the MME triggers paging of the UE using generic paging procedures (i.e. it must verify that the UE is actually available in an eUTRAN cell) where the page it sends to the eNodeB does not indicate that an Inter-RAT PS handover to a GERAN/UTRAN cell should be performed. Upon receiving a service request from the UE (via the eNodeB) in response to the paging attempt and knowing that it supports a Gs-like interface to an MSC, the MME will realize that an Inter-RAT PS handover to GERAN/UTRAN is necessary and can therefore respond to the service request by ordering the eNodeB to perform an Inter-RAT PS HO to a GERAN/UTRAN cell for that UE (i.e. instead of performing call establishment procedures in the packet switched domain).

In another embodiment related to the direct case, the eNodeB will, upon getting a Page Response from the UE (i.e. confirming it is present in a specific E-UTRAN cell), have the authority to trigger the PS handover procedure and as a result send the UE a PS Handover Command. This is possible when the MME uses the Page it sends to the eNodeB to effectively convey its knowledge of the presence of the Gs like interface Within the 3GPP CS domain both Location Area (LA) and Service Area (SA) are fundamental concepts used for various purposes, for example to support CS service 'control' based on geographical areas. The Location Area and Service Area concepts may be inherently supported by the EPS and/or with a mapping between the LTE Tracking Area and the 2G/3G cell structures (i.e. LA and SA).

Figure 4:
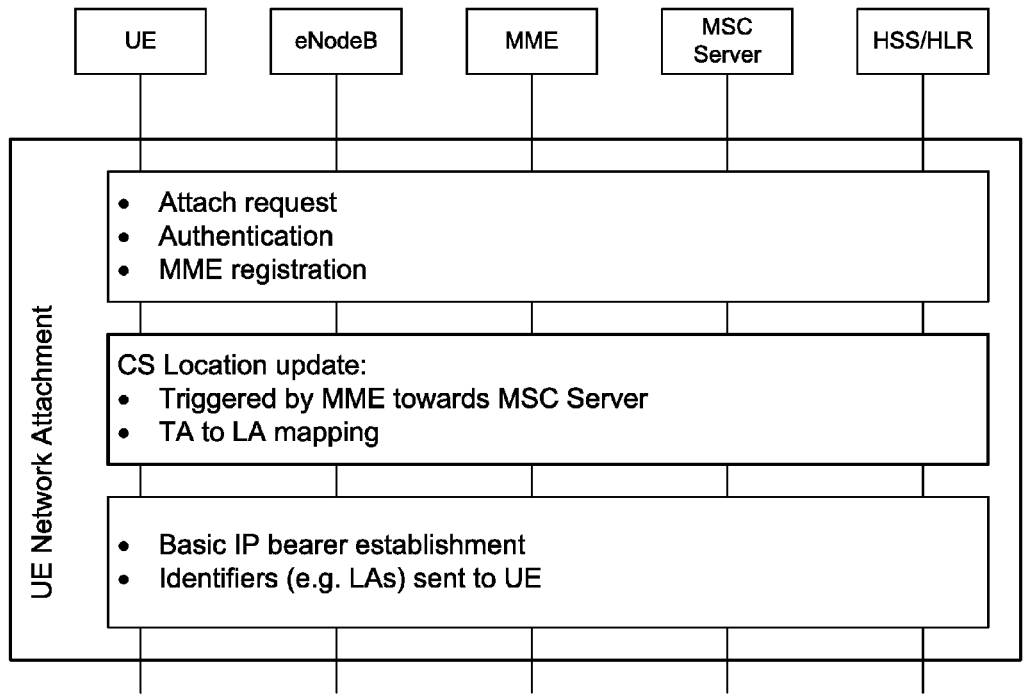
FIG. 4 shows a UE network attachment procedure.

As described above, EPS mobility management is provided through a mobility management entity (MME) 15. An example of mobility management is shown in FIG. 4 with the specific example of the network attachment of a UE. The UE is provided with identifiers needed to establish CS voice service. The UE sends an attach request to the eNodeB which results in the UE being authenticated prior to MME registration. While operating within LTE coverage (i.e. while there is no need to establish a voice service) CS Location updates may be triggered by the MME 15 towards the MSC Server 22 using an LTE tracking area (TA) to location area (LA) mapping. It should be noted that the CS attachment may be embedded and that the CS Location Update procedure can either be triggered by the UE (e.g. with LA structure visible in broadcast) or by the MME (based on mapping from the TA structure of LTE/SAE). Once the basic IP bearers are established, the identifiers (e.g. LAs) may be sent to the UE. The same concepts may be used when the UE is roaming to other LTE coverage areas. That is, the LTE TA update procedure may include the CS Location Update procedure.

Before initiating an originating CS voice service, the UE is moved to a 2G/3G cell using PS handover. After arriving in the 2G/3G cell all subsequent call establishment signaling is identical to a 2G/3G originating call and eUTRAN and EPC are not involved.

Figure 5:
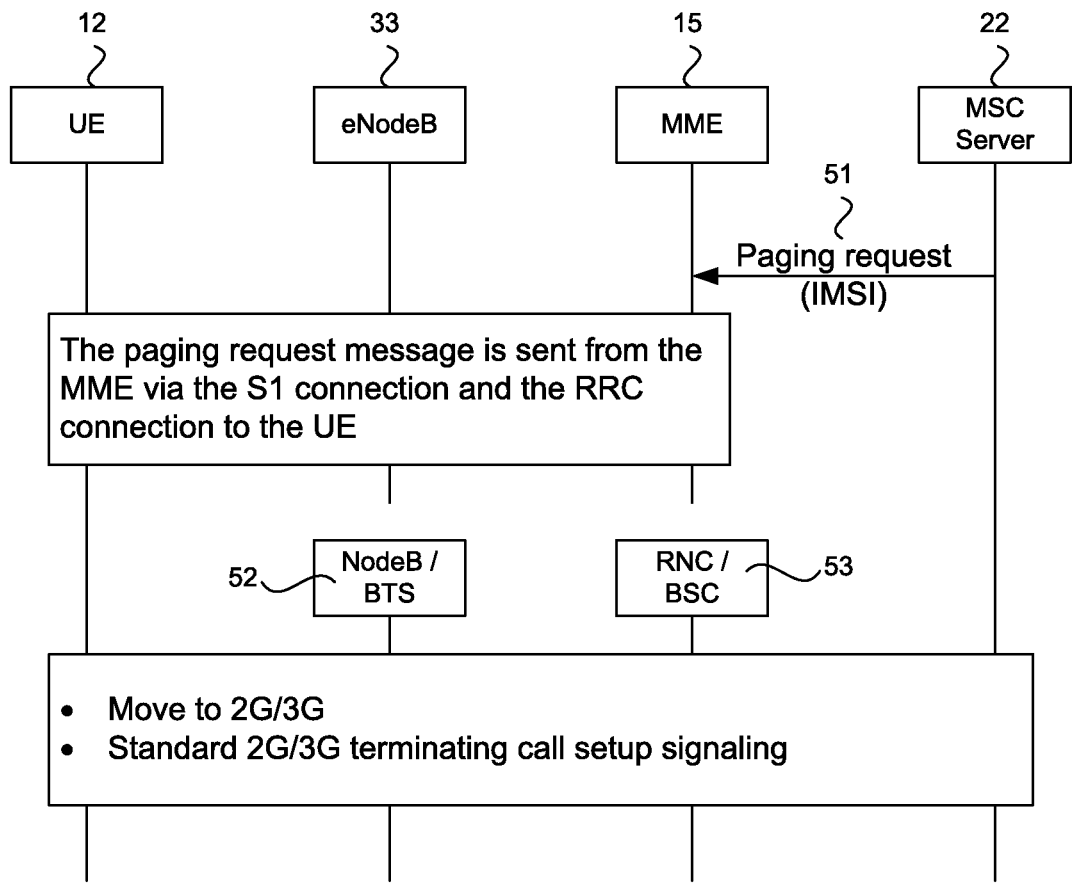
FIG. 5 shows a terminating voice call.

The terminating call handling when eUTRAN is active is depicted in FIG. 5. The paging request 51, including International Mobile Subscriber Identity (IMSI) originates in the MSC Server 22 and is sent to the MME 15. The MME 15 sends the paging request to the eNodeB 33 via the S1 interface and the Radio Resource Control (RRC) connection may then be used to extend the paging notification to the UE 12. The reception of the paging notification at the UE 12 may cause it to send only a page response (i.e. excluding measurement report information) to the eNodeB 33 which then triggers the eNodeB to send the UE 12 a PS handover command using existing measurement report information (i.e. the direct case of MT CS domain voice service establishment). The UE is moved to a 2G/3G cell (using PS handover) prior to the call establishment signaling. After arriving in the 2G/3G cell all subsequent call establishment signaling is identical to that used for legacy mode operation where a 2G/3G terminating call is triggered when a UE is being served by a 2G/3G cell, e.g. using NodeB 52 and Radio Network Controllers 53.

As will be apparent to a person skilled in the art, the presently described embodiments leverage on existing 2G/3G mechanisms. However, there is no impact on the 2G/3G RAN and the level of impact on the 2G/3G core network is minor with no new protocol being required.

The presently described embodiments may be understood as a cost efficient "gap filler" to provide CS voice services that offers the operator a bit more time to migrate to MTSI when deploying eUTRAN.

The terms and descriptors used herein follow standard terminology used in the 3GPP standards for Evolved Packet Systems and Long Term Evolution. Description of features, interfaces and performance not forming part of the innovative concepts are omitted for the sake of clarity.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A mobility management entity configured to:
receive a voice service page in respect of a user equipment;
forward the voice service page requiring a voice call establishment of the user equipment in a circuit switched cell;
receive a service request from the user equipment in response to the forwarded voice service page; and
request a handover procedure of the user equipment to the circuit switched cell.

2. The mobility management entity according to claim 1, wherein the handover procedure request results in a handover command to the user equipment.

3. The mobility management entity according to claim 2 wherein said handover command indicates said circuit switched cell.

4. The mobility management entity according to claim 2 wherein said handover command comprises an indication of a circuit switched voice service requirement.

5. The mobility management entity according to claim 4 wherein said indication comprises said voice service page.

6. The mobility management entity according to claim 1 further configured to trigger a location area of a circuit switched core network.

7. The mobility management entity according to claim 6 further configured to trigger the location area toward a Mobile Switching Center using a Long Term Evolution tracking area to the location area mapping.

8. The mobility management entity according to claim 7 further configured to support a Gs-like interface to the Mobile Switching Center.

9. The mobility management entity according to claim 8 further configured to perform a circuit switched location update procedure through said Gs-like interface.

10. A method for providing voice service in a network comprising an Evolved Packet Core, the method comprising:

receiving a voice service page in the Evolved Packet Core in respect of a user equipment;

accessing a measurement report history for the user equipment;

determining a circuit switched cell from the measurement report history; and initiating a handover procedure of the user equipment to the circuit switched cell, upon the user equipment and a base station supporting the circuit switched cell both supporting a dual transfer mode, maintaining a packet switched resource with the base station when the user equipment is moved to the circuit switched cell; and upon either the user equipment or the base station not supporting a dual transfer mode, dropping a packet switched resource when the user equipment is moved to the circuit switched cell.

11. The method according to claim 10 further comprising providing a handover command to the user equipment.

12. The method according to claim 10 further comprising mapping a tracking area of said Evolved Packet Core to a Location Area of a Circuit Switched Core.

13. A method for providing voice service to User Equipment (UE) operating in a packet switched domain of an Evolved Universal Mobile Telecommunications System Terrestial Radio Access Network (eUTRAN) cell, the method comprising:

receiving a voice service page in an Evolved Packet Core;

accessing a measurement report history, based on the voice service page, for the UE to determine one or more available circuit switched cells;

selecting one of said one or more available circuit switched cells;

initiating a handover procedure of the UE from the eUTRAN cell to the selected one of said one or more available circuit switched cells, said handover procedure establishing voice service between a circuit switched domain of the circuit switched cell and said UE;

upon the UE and a base station supporting the selected circuit switched cell both supporting a dual transfer mode, maintaining a packet switched resource with the base station when the user equipment is moved to the circuit switched cell; and upon either the user equipment or the base station not supporting a dual transfer mode, dropping a packet switched resource when the user equipment is moved to the circuit switched cell.

14. The method according to claim 13 further comprising the UE sending a page response through the selected circuit switched cell at the completion of said handover procedure.

15. The method according to claim 13 further comprising sending a handover command from the eUTRAN cell to the UE.

16. The method according to claim 15 wherein said handover command indicates said selected circuit switched cell.

17. The method according to claim 15 wherein said handover command comprises an indication of a circuit switched voice service requirement.

18. The method according to claim 17 wherein said indication comprises said voice service page.

19. The method according to claim 17 further comprising the UE sending a page response through the selected circuit switched cell at the completion of said handover procedure.

20. The method according to claim 13 further comprising ceasing one or more packet switched services.

21. The method according to claim 13 further comprising mapping a tracking area of said Evolved Packet Core to a Location Area of a Circuit Switched Core.

22. The method according to claim 13 wherein said voice service page is received from a mobile switching center.

23. The method according to claim 22 wherein said voice service page is received by a Mobility Management Entity of said Evolved Packet Core through a Gs-like interface with said mobile switching center.

24. The method according to claim 23 further comprising performing a circuit switched Location Update procedure for said UE through said Gs-like interface.

25. The method of claim 13, wherein further upon either the user equipment or the base station not supporting a dual transfer mode, initiating a packet switched handover to the base station before establishing voice service in the circuit switched cell.

26. The method of claim 13, further comprising determining if Internet Protocol (IP) Multimedia Subsystem service is supported.

27. The method of claim 13, further comprising:

upon the voice service page indicating an indirect MT voice service request, triggering paging of the UE using generic paging procedures wherein the page sent to the UE does not indicate that an Inter-Radio Access Technology (RAT) packet switched handover should be performed; and upon the voice service page indicating a direct MT voice service request, triggering paging of the UE wherein the page sent to the UE indicates that an Inter-RAT packet switched handover should be performed.

28. An Evolved Universal Mobile Telecommunications System Terrestial Radio Access Network (eUTRAN) network comprising:

at least one eUTRAN cell comprising at least one eNodeB;

wherein the at least one eNodeB is configured to receive a page for voice service for a User Equipment (UE) serviced by the eNodeB and to access a measurement report history for said User Equipment (UE) to handover said UE to a circuit switched cell;

upon the user equipment and a base station supporting the circuit switched cell both supporting a dual transfer mode, a packet switched resource is maintained with the base station when the user equipment is moved to the circuit switched cell; and upon either the user equipment or the base station not supporting a dual transfer mode, a packet switched resource is dropped when the user equipment is moved to the circuit switched cell.

29. The network according to claim 28 wherein said at least one eNodeB is configured to use said measurement report history to select an available circuit switched cell for said handover.

30. The network according to claim 28 wherein said at least one eNodeB is configured to transmit a handover command to said UE.

31. The network according to claim 30 wherein said handover command indicates a selected available circuit switched cell.

32. The network according to claim 28 further comprising:

at least one Evolved Packet Core (EPC) comprising a Mobility Management Entity; and a Gs-like interface between said Mobility Management Entity and a mobile switching center of a circuit switched core network;

wherein the eUTRAN network is configured to handover said UE to a circuit switched cell in response to identifying the presence of the Gs-like interface.

33. The network according to claim 28 wherein said page for voice service is received by said Mobility Management Entity from said mobile switching center through said Gs-like interface.

34. The network according to claim 33 wherein the EPC is configured to perform a circuit switched Location Update procedure through said Gs-like interface.

* * * * *